Figure 1:
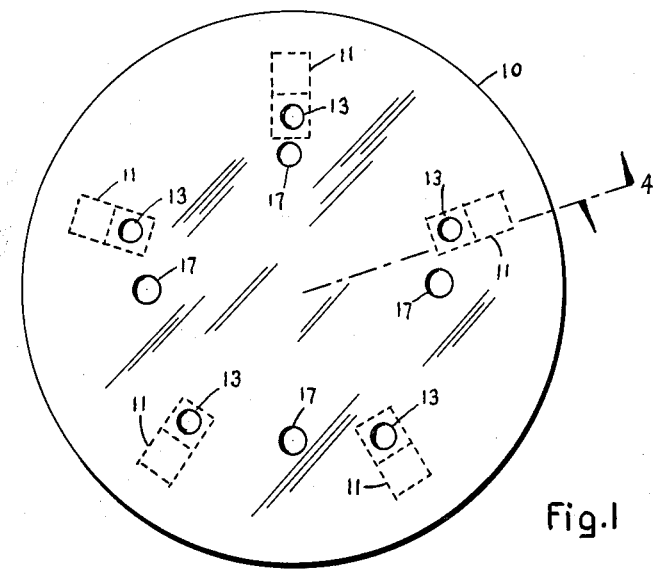

Jan. 10, 1956  G. C. FITZGERALD  2,730,406
ANTI-SKID DEVICE

Filed Dec. 29, 1952  2 Sheets-Sheet 1

INVENTOR.
GERALD C. FITZGERALD

Jan. 10, 1956  G. C. FITZGERALD  2,730,406
ANTI-SKID DEVICE
Filed Dec. 29, 1952  2 Sheets-Sheet 2
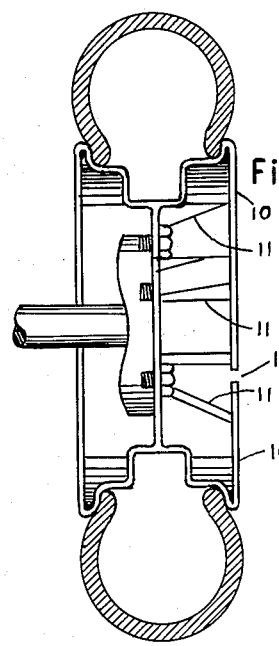
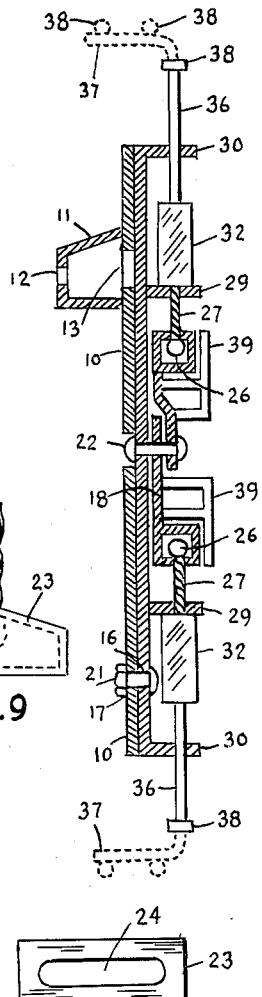
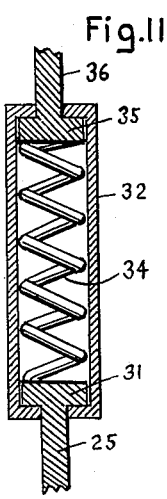
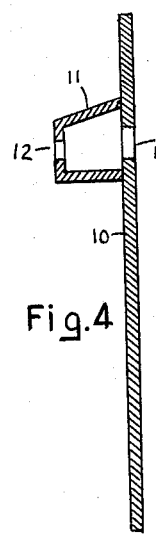
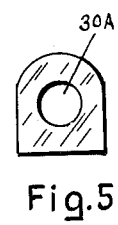
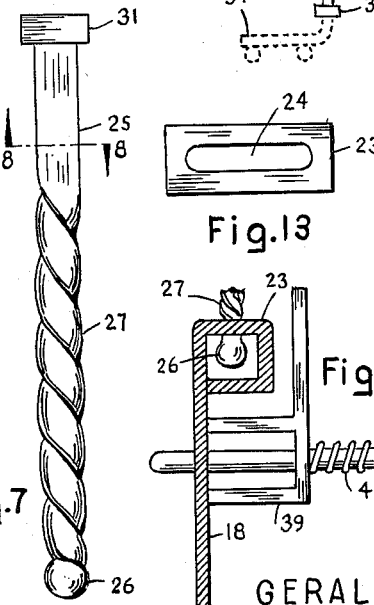
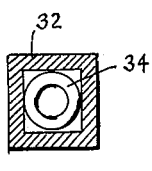
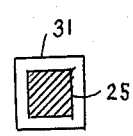
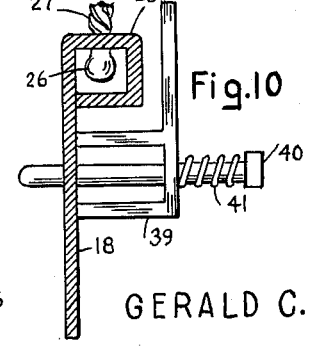
INVENTOR.
GERALD C. FITZGERALD

United States Patent Office 2,730,406
Patented Jan. 10, 1956

2,730,406

ANTI-SKID DEVICE

Gerald C. Fitzgerald, East Hartford, Conn.

Application December 29, 1952, Serial No. 328,355

3 Claims. (Cl. 301—47)

The present invention relates to an anti-skid device and it consists in the combinations, constructions and arrangements of parts herein described and claimed.

Generally there is provided an anti-skid device which may be quickly and easily mounted upon a conventional automobile wheel and which, by the mere turning of a handle will extend outwardly a plurality of shafts and at the same time turn the same so that lateral outer portions of such shaft will extend across the periphery of the tire of such wheel. The lateral portions referred to each have affixed thereto a plurality of gripping bars which will thereupon act much in the manner of anti-skid chains. The advantage of the present apparatus over the conventional chains is the ease of mounting the same and the ease with which the skid devices may be placed into operative position or removed from such position.

It is accordingly an object of the invention to provide a novel anti-skid device having novel means for attaching the same to a conventional automobile wheel.

Another object of the invention is to provide, in a device of the character set forth, novel means for extending and positioning a plurality of skid devices forming a part of the invention.

Another object of the invention is to provide an anti-skid device of the character set forth which may remain in position upon the wheel of an automobile even when not in use.

Another object of the invention is to provide a device of the character set forth which is simple in construction, inexpensive to manufacture and yet effective and efficient in use.

Figure 2:
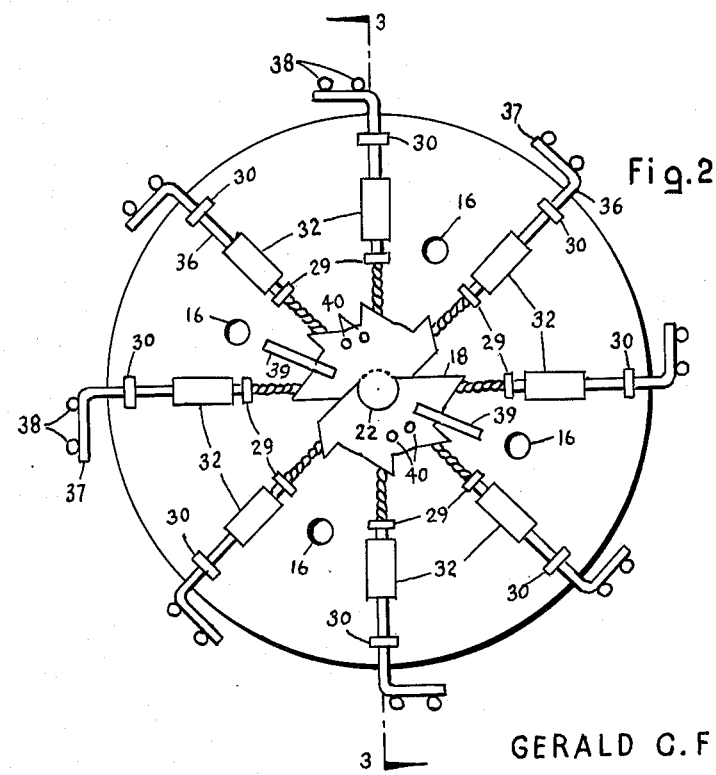

Other and further objects of the invention will become apparent from a reading of the following specification taken in conjunction with the drawing, in which:

Figure 1 is an elevational view of a mounting plate forming a part of the invention, Figure 2 is an elevational view of a backing plate and allied mechanisms forming a part of the invention, Figure 3 is a fragmentary sectional view taken substantially along line 3—3 of Figure 2, Figure 4 is an enlarged fragmentary sectional view taken substantially along line 4—4 of Figure 1, Figure 5 is a plan view of an outer bracket forming a part of the invention, Figure 6 is a plan view of an inner bracket forming a part of the invention, Figure 7 is an elevational view of a shaft forming a part of the invention, Figure 8 is a sectional view taken along line 8—8 of Figure 7, Figure 9 is an elevational view, fragmentary in form, of a sliding bracket forming a part of the invention, Figure 10 is a sectional view of Figure 9, Fig. 11 is a longitudinal sectional view of a sleeve used in the device, Fig. 12 a cross sectional view of the sleeve, Fig. 13 a plan view of casing shown in Fig. 9, and Fig. 14 is a sectional view of a wheel with a mounting plate attached thereto.

Referring more particularly to the drawing, there is shown therein a device of the character set forth comprising a circular mounting plate 10 having a plurality of circumferentially spaced inwardly extending brackets 11 each of which is provided at its inner end with an opening 12 for receiving therethrough the conventional bolt of a wheel. The plate 10 is provided with openings 13 which register with the openings 12 so that access may be had to the nuts upon the bolts referred to.

There is also provided a circular backing plate 15 which is provided with four circumferentially spaced openings 16 which are adapted to register with four like openings 17 in the plate 10 so that the two plates may be bolted or otherwise fastened together therethrough.

A lift plate 18 is centrally and pivotally mounted, as indicated at 22, upon the plate 15 and is provided with a plurality of circumferentially spaced housings 23 having a slot 24 formed therein. Extending radially into each of the housings 22 is a shaft 25 which is square in cross section, as indicated in Figure 8 and which is provided at its inner end with a rounded head 26 which is confined within the casing 23. The shaft or bar 25 is twisted, as indicated at 27 throughout its inner portion whereby to provide a means for rotating the shaft 25 when the same extends through a square opening 28 formed in an inner bracket 29, such inner brackets 29 being affixed to the plate 15. There is also provided with each of the brackets 29 an outer bracket 30 having a round opening 30A, such brackets also being affixed to the plate 15 in circumferentially spaced relation. The outer end of the shaft 25 is provided with a square head 31 which is slidably mounted within a sleeve 32 having an internal square cross section and each of the heads 31 is connected by means of a compression spring 34 with the square head 35 upon the inner end of a shaft 36 which is round in cross section the outer end of each of which is provided with a laterally extending integrally formed arm 37. Each of the arms 37 is provided upon its outer side with one or more cross bars 38 which act as gripping members. A handle 39 is affixed to the outer side of the plate 18 and a plurality of locking pins 40 each of which is provided with a spring 41 adapted to urge the same inwardly through the plate 15 and suitable openings therein, is likewise mounted in the plate 18.

Mounting plate 10 is bolted onto the existing wheel studs. The existing wheel nuts clamp onto brackets 11. The wheel studs fit into openings 12. Mounting plate 10 is necessary since the number and arrangement of rods 36 are such that they would interfere with access to wheel studs on a car with five studs. It could be eliminated on a car with four wheel studs. The wheel studs are accessible through openings 13.

Backing plate 15 is then fastened to mounting plate 10 by means of bolts 21. The arms 37 are now in retracted position. In other words, plate 18 is in its extreme counter-clockwise position. To operate one side, locking pin 40 is raised. Turning arm 39 is then rotated in a clockwise direction and locking pin 40 is reset. Turning of arm 39 moves opening 24 in a clockwise direction. The pitch of opening 24, caused by the design of casing 23, also causes knob 26 to move upward. Since knob 26, rod 27, and head 31 are all one piece, they all move upward. Plate 18 revolves about rivet 22.

Since rod 27 is twisted, upward movement causes it to turn. As head 31 moves up and turns, it in turn exerts pressure on spring 34 in sleeve 32 and turns sleeve 32. The pressure on spring 34 is transmitted to head 35, thereby raising and turning head 35. Since head 35, rod 36, and arm 37 are one piece it follows that arm 37 is thereby raised and placed over the tread of the tire.

Rod 27 slides in square opening 28 in bracket 29 while rod 36 slides in round opening 30-A in bracket 30'.

While but one form of the invention has been shown and described herein, it will be readily apparent to those skilled in the art that many minor modifications may be made without departing from the spirit of the invention or the scope of the appended claims.

What is claimed is:

1. In combination with a vehicle wheel having a tire mounted thereon, a mounting plate having means to enable it to be attached to said wheel, a backing plate, means for securing the backing plate to the mounting plate, a lift plate rotatably mounted on the backing plate, an inner arm having one end thereof slidably mounted on the lift plate, an inner plate bracket projecting from the backing plate and having a rectangular opening, said inner arm having a twisted portion passing through the opening in the inner bracket to cause rotation of the arm when the arm is moved longitudinally, a sleeve having a chamber of rectangular cross section, said sleeve having shoulders at its upper and lower ends, a rectangular head on the inner arm positioned in the chamber and engaging the lower shoulder of the sleeve, an upper arm of circular cross section and having a rectangular head positioned in the chamber and engaging the upper shoulder, an upper bracket projecting from the backing plate and having a circular opening through which the upper arm passes, said upper arm having an angularly directed portion, a spring positioned in the chamber between the heads of said arms and normally urging the upper arm upwardly, and means to rotate the lift plate to move the inner arm up or down.

2. The structure set forth in claim 1 further characterized by cross bars fixed to the angularly direct portion of the upper arm.

3. The structure of claim 2 further characterized by detent means to hold the lift plate in either of two positions.

References Cited in the file of this patent

UNITED STATES PATENTS

| 1,257,145 | Stern | Feb. 19, 1918 |
| 1,366,810 | Kimble et al. | Jan. 25, 1921 |
| 1,435,863 | Lantz | Nov. 14, 1922 |